(12) United States Patent
Seiller

(10) Patent No.: US 11,420,598 B2
(45) Date of Patent: Aug. 23, 2022

(54) WINDSCREEN WIPER ARM, PARTICULARLY FOR AUTOMOBILES

(71) Applicant: TRICO BELGIUM S.A., Aubange (BE)

(72) Inventor: Guillaume Seiller, Ribeauville (FR)

(73) Assignee: TRICO BELGIUM SA, Aubange (BE)

( * ) Notice: Subject to any disclaimer, the term of this patent is extended or adjusted under 35 U.S.C. 154(b) by 90 days.

(21) Appl. No.: 16/960,576

(22) PCT Filed: Jan. 8, 2018

(86) PCT No.: PCT/EP2018/050352
§ 371 (c)(1),
(2) Date: Jul. 8, 2020

(87) PCT Pub. No.: WO2019/134756
PCT Pub. Date: Jul. 11, 2019

(65) Prior Publication Data
US 2021/0001818 A1   Jan. 7, 2021

(51) Int. Cl.
*B60S 1/52* (2006.01)
*B60S 1/34* (2006.01)

(52) U.S. Cl.
CPC ............. *B60S 1/522* (2013.01); *B60S 1/3415* (2013.01); *B60S 1/3468* (2013.01)

(58) Field of Classification Search
CPC ....... B60S 1/522; B60S 1/3415; B60S 1/3468
See application file for complete search history.

(56) References Cited

U.S. PATENT DOCUMENTS

| 6,442,788 B1* | 9/2002 | Fleischer | B60S 1/522 15/250.04 |
| 2003/0009841 A1 | 1/2003 | Sato | |
| 2007/0018012 A1* | 1/2007 | Harris | B29C 45/261 239/284.1 |

FOREIGN PATENT DOCUMENTS

| DE | 102015224631 | 6/2017 |
| FR | 2286735 | 4/1976 |
| JP | 2002302019 | 10/2002 |
| JP | 2002308064 | 10/2002 |
| WO | 2013149676 | 10/2013 |

* cited by examiner

*Primary Examiner* — Andrew A Horton
(74) *Attorney, Agent, or Firm* — Bryan Cave Leighton Paisner LLP

(57) ABSTRACT

A windscreen wiper arm comprising a wiper arm member having a substantially U-shaped cross-section arranged to be pivotally connected to a mounting head mounted on a drive shaft, and a wiper rod having a first end rigidly connected to and extending inside said wiper arm member and a second end arranged to be connected to an elongated wiper blade to be placed in abutment with a windscreen to be wiped. The windscreen wiper arm includes a nozzle for spraying a washing liquid onto said windscreen to be wiped, where said nozzle is detachably connected to said wiper rod inside the U-shaped cross-section of the wiper arm member.

9 Claims, 5 Drawing Sheets

WINDSCREEN WIPER ARM, PARTICULARLY FOR AUTOMOBILES

BACKGROUND OF THE INVENTION

German patent publication no. 34 33 106 (SWF Auto-Electric GmbH) discloses an oscillating windscreen wiper arm comprising an arm member pivotally connected to the mounting head by means of a pivot pin. The arm member has a substantially U-shaped cross-section near the pivot pin having two side walls. A part of the mounting head extends between the side walls and beyond the pivot pin. A spring is hooked with its first end on a pin on the mounting head. The arm member is connected to a wiper rod, where one end of the wiper rod extends inside the U-shaped cross-section of the arm member. The side walls of the arm member are locally folded around the wiper rod, while a holder is folded around the end of the rod. The spring of this prior art windscreen wiper arm is hooked with its first end on the pin on the mounting head and with its second end on two eyes of the holder.

A disadvantage of the windscreen wiper arm known from the above German patent publication is that that the windscreen wiper arm is often used in combination with a nozzle fixedly mounted on (or below) a bonnet of a car for spraying a washing liquid onto the car's windscreen to be wiped. In practice it has become apparent that the windscreen cannot effectively be cleaned by a combination of the known windscreen wiper arm and the nozzle, as the nozzle emits the washing fluid at a large distance relative to the windscreen, so that a relatively large amount of the washing fluid does not effectively reach a wiping pattern on the windscreen to be wiped. Further, it has become apparent that in the prior art a large amount of liquid (consumption) is required in an attempt to clean the windscreen to be wiped. Further, if the washing fluid is spread onto the car's body instead of onto the windscreen to be wiped, it may damage the car. Indeed, ethanol, methanol and other components of the washing fluid are believed to have a corrosive effect on paint, rubber, car wax and plastics, for example.

SUMMARY OF THE INVENTION

It is an object of the invention to obviate these disadvantages, in the sense that at minimum cost—without using complex machinery and additional tools—a simple windscreen wiper arm is proposed to effectively clean a windscreen to be wiped, without damaging parts of a car, where less washing liquid is required to clean the windscreen to be wiped.

The present invention relates to a windscreen wiper arm, particularly for automobiles, that is able to oscillate to-and-from between a first reversal position and a second reversal position.

The windscreen wiper arm comprises a wiper arm member having a substantially U-shaped cross-section, as well as a wiper rod. The wiper arm member at one end is arranged to be pivotally connected to a mounting head mounted on a drive shaft. The wiper arm member at another end is rigidly connected to the wiper rod. The wiper rod has a first end that extends inside the U-shaped cross-section of the wiper arm member. The wiper rod has a second end that is arranged to be connected to an elongated wiper blade to be placed in abutment with a windscreen to be wiped.

The present invention particularly relates to a windscreen wiper arm for an elongated wiper blade in the form of a so-called flat blade, where an elastic elongated carrier element is provided. The flat blade includes at least one longitudinal groove, in which a longitudinal strip (also called a "flexor") of the carrier element is disposed. There is no restriction to the use of only one longitudinal strip forming the elastic carrier element that is particularly located in a central longitudinal groove of the flat blade. Instead, the carrier element may also comprise two longitudinal strips, where the strips are disposed in opposite longitudinal grooves of the flat blade. The groove(s) may be closed at one outer end. The flat blade comprises a connecting device (also referred to as a "connector") arranged to be connected to the windscreen wiper arm. Preferably, the connector is made in one piece, also called a "one piece connector". Particularly, the flat blade comprises a spoiler at a side facing away from the windscreen to be wiped. The flat blade and the spoiler are preferably made in one piece through extrusion. The present invention is not limited to flat blades, but can also be applied in traditional windscreen wiper devices having yokes.

The mounting head is usually fixed for rotation to the shaft. The shaft is rotatable alternately in a clockwise and in a counter-clockwise sense carrying the mounting head into rotation. Thus, in turn the mounting head draws the connecting device into rotation and thereby moves the flat blade. In the alternative, the mounting head is fixed for translation to a carriage, where the carriage can be translated alternately in a one linear direction and in another counter linear direction carrying the mounting head into translation. The present invention can therefore be used for circular or linear movement of the mounting head.

According to the invention, a windshield wiper arm is characterized in that the windscreen wiper arm is provided with a nozzle for spraying a washing liquid onto the windscreen to be wiped. The nozzle is detachably connected to the wiper rod inside the U-shaped cross-section of the wiper arm member. Particularly, the nozzle is snapped onto the wiper rod near the first end that extends inside the U-shaped cross-section of the wiper arm member. By connecting the nozzle directly to the wiper rod and inside the U-shaped cross-section of the wiper arm member, the nozzle is not only fixed to the windscreen wiper arm in a reliable and controllable manner, although detachably in case of repair or replacement of the nozzle, but the nozzle is also hidden from the outside and thus invisible for a driver and people outside. Further, by connecting the nozzle to the wiper rod and inside the U-shaped cross-section of the wiper arm member, the nozzle is located at a very small distance relative to the windscreen to be wiped and is allowed to directly follow any oscillatory movement of the windscreen wiper arm, so that the washing fluid exiting the nozzle can be effectively sprayed onto the windscreen, with all positive consequences involved as to effective cleaning of the windscreen to be wiped and safe visibility for a driver. Further, the nozzle may be used as a first nozzle in combination with a second nozzle located at the second end of the wiper rod arranged to be connected to the elongated wiper blade for spraying a washing liquid onto the windscreen to be wiped. Hence, in that case the washing liquid is sprayed from at least two locations on the windscreen wiper arm onto the windscreen to be wiped. First, the washing liquid exits from the first nozzle connected at the first end of the wiper rod that extends inside the U-shaped cross-section of the wiper arm member. Second, the washing liquid exits from the second nozzle connected at the second end of the wiper rod that is arranged to be connected to the wiper blade. Thus, the windscreen can be cleaned efficiently over a very large wiping area, particularly at high speeds. In that case, the first and second nozzles are preferably connected to only one inlet for the washing fluid, so that the first and second nozzles are in liquid contact with each other.

It is noted that the present invention is not restricted to cars, but also refers to rail coaches and other (fast) vehicles.

In a preferred embodiment of a windscreen wiper arm in accordance with the invention, the nozzle has a substantially U-shaped cross-section having a base and two spaced-apart sidewalls. The sidewalls in use face away from the windscreen to be wiped (i.e. in use facing towards a base of the U-shaped cross-section of the wiper arm member) and are snapped around the wiper rod. The base and the sidewalls of the U-shaped cross-section of the nozzle particularly define a guiding groove for slidingly guiding the nozzle in a longitudinal direction onto the wiper rod.

In a further preferred embodiment of a windscreen wiper arm according to the invention, the wiper rod near the first end that extends inside the U-shaped cross-section of the wiper arm member bends outwardly and comprises a hole for hooking an end of a spring.

In a further preferred embodiment of a windscreen wiper arm in accordance with the invention, the windscreen wiper arm comprises a spring inside the U-shaped cross-section of the wiper arm member. The spring at one end is arranged to be connected to the mounting head and at another end is arranged to be connected to the wiper rod through the hole (i.e. an end of the spring hooks into the hole). A movement of the nozzle in the longitudinal direction is blocked by the spring in a direction towards the mounting head, and by tapering sidewalls of the U-shaped cross-section of the wiper arm member in a direction away from the mounting head. Hence, the nozzle is not allowed to move in the longitudinal direction once being snapped onto the wiper rod, as it is "trapped" between the spring and the tapering sidewalls of the U-shaped cross-section of the wiper arm member. Thus, the nozzle is a universal nozzle in the sense that it is blocked against any longitudinal movement, also in the case when wiper arm members mutually differ in the width of their U-shaped cross-sections.

In a further preferred embodiment of a windscreen wiper arm according to the invention, the nozzle comprises two spraying openings for spraying the washing fluid onto the windscreen to be wiped.

In a further preferred embodiment of a windscreen wiper arm in accordance with the invention, the nozzle comprises an inlet pipe for conveying the washing liquid towards the nozzle, and an outlet pipe for conveying the washing liquid away from the nozzle. Preferably, the outlet pipe is arranged to convey the washing liquid away from the nozzle and towards a second nozzle located near the second end of the wiper rod.

In a further preferred embodiment of a windscreen wiper arm according to the invention, the wiper arm member is made integrally from a single sheet material. Parts of the sheet material are folded outwardly to form legs of the U-shaped cross-section of the wiper arm member. The legs of the U-shaped cross-section of the wiper arm member are locally folded around the wiper rod near the second end that extends inside the U-shaped cross-section of the wiper arm member.

In a further preferred embodiment of a windscreen wiper arm in accordance with the invention, the second end of the wiper rod is arranged to be pivotally connected through a bayonet connection to an elongated wiper blade of the flat blade type.

The present invention also relates to a method for manufacturing a windscreen wiper arm, particularly for automobiles, where the windscreen wiper arm is able to oscillate to-and-from between a first reversal position and a second reversal position. The windscreen wiper arm comprises a wiper arm member having a substantially U-shaped cross-section and a wiper rod. The wiper arm member at one end is arranged to be pivotally connected to a mounting head mounted on a drive shaft. The wiper arm member at another end is rigidly connected to the wiper rod. The wiper rod has a first end that extends inside the U-shaped cross-section of the wiper arm member, and a second end arranged to be connected to an elongated wiper blade to be placed in abutment with a windscreen to be wiped. The windscreen wiper arm comprises a spring inside the U-shaped cross-section of the wiper arm member. One end of the spring is arranged to be connected to the mounting head, and another end of the spring is arranged to be connected to the wiper rod. The windscreen wiper arm is provided with a nozzle for spraying a washing liquid onto the windscreen to be wiped. The nozzle is detachably connected to the wiper rod inside the U-shaped cross-section of the wiper arm member.

BRIEF DESCRIPTION OF THE DRAWINGS

The invention will now be explained in more detail with reference to figures illustrated in a drawing, wherein.

DETAILED DESCRIPTION OF THE PREFERRED EMBODIMENTS

Figure 1:
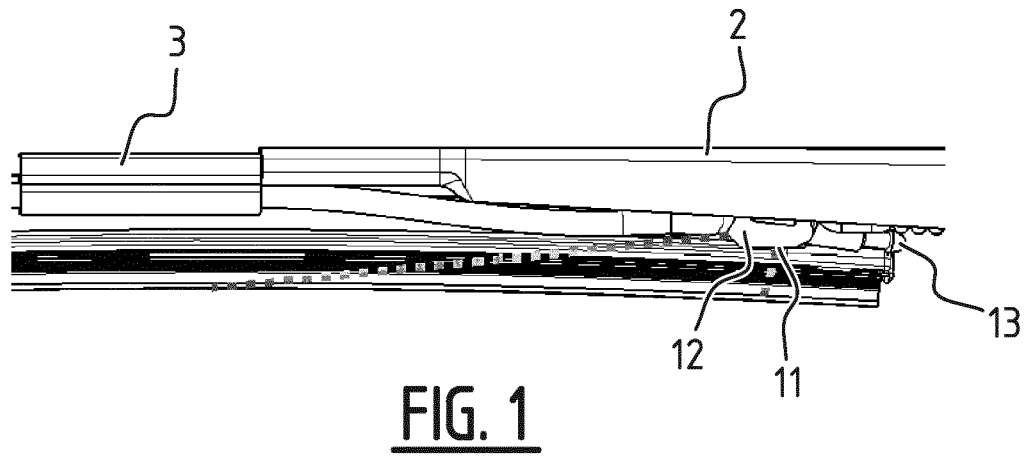
FIG. 1 is a side schematic view of a windscreen wiper arm in a wiping position equipped with a wiper blade of the flat blade type.
Figure 2:
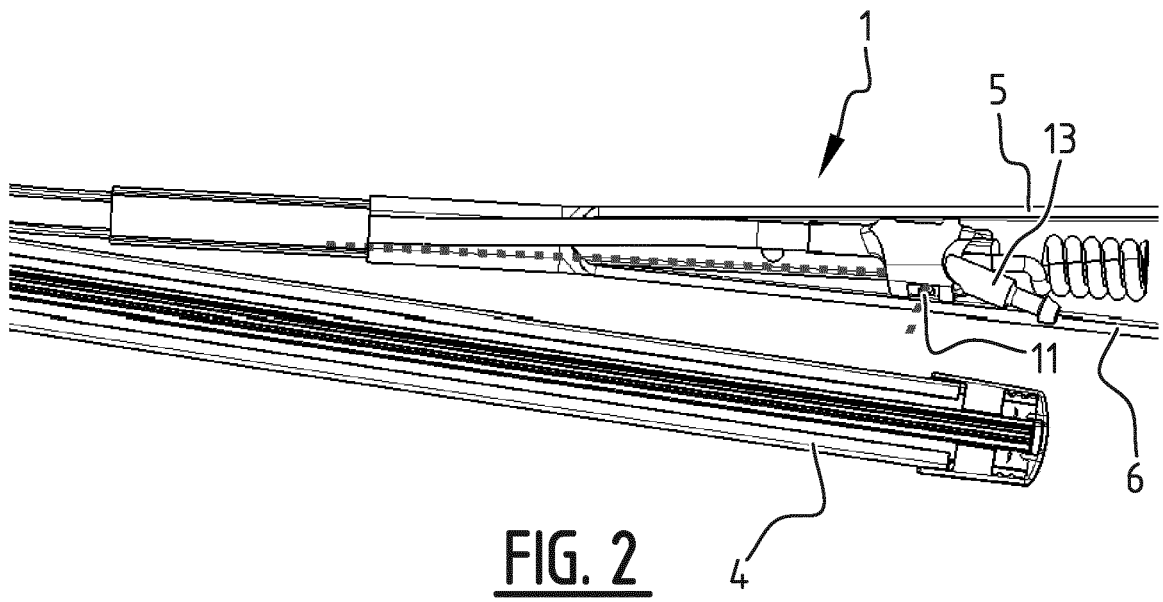
FIG. 2 is a bottom schematic view of a windscreen wiper arm in a wiping position equipped with a wiper blade of the flat blade type

FIGS. 1 and 2 show a windscreen wiper arm 1, particularly for automobiles, that is able to oscillate to-and-from between a first reversal position and a second reversal position over a windscreen to be wiped (not shown). The windscreen wiper arm 1 includes a wiper arm member 2 having a substantially U-shaped cross-section and a wiper rod 3. The wiper arm member 2 at a first free end thereof is arranged to be pivotally connected to a mounting head (not shown) mounted on a drive shaft (not shown). The drive shaft is rotatable by a small motor alternately in a clockwise and in a counter-clockwise sense carrying the mounting head into rotation. Thus, in turn the mounting head draws the windscreen wiper arm 1 into rotation and thereby moves a flat blade 4 connected thereto. The wiper arm member 2 at second free end thereof (opposite to its first free end) is rigidly connected to the wiper rod 3. The wiper arm member 2 is made integrally from a single sheet material, for example a metal. Parts of the sheet material are folded outwardly to form legs 5, 6 of the U-shaped cross-section of the wiper arm member 2. The legs 5, 6 of the U-shaped cross-section of the wiper arm member 2 are locally folded around the wiper rod 3 to form their rigid interconnection. As shown, the wiper rod 3 at a first free end thereof extends inside the U-shaped cross-section of the wiper arm member 2. The wiper rod 3 at a second free end thereof (opposite to its first free end) is connected to the flat blade 4 to be placed in abutment with a windscreen to be wiped.

As shown in FIGS. 1 and 2 and more in detail in FIGS. 4 through 7, the windscreen wiper arm 1 is provided with a nozzle 7 for spraying a washing liquid onto the windscreen to be wiped. The nozzle 7 is detachably snapped to the wiper rod 3 inside the U-shaped cross-section of the wiper arm member 2 to allow its repair and/or replacement. The nozzle 7 has a substantially U-shaped cross-section having a base 8 and two spaced-apart sidewalls 9, 10. The sidewalls 9,10 in use face away from the windscreen to be wiped and are snapped around the wiper rod 3. The nozzle 7 comprises two spraying openings 11, 12 for spraying the washing fluid onto the windscreen to be wiped. Further, the nozzle 7 comprises an inlet pipe 13 for conveying the washing liquid towards the nozzle 7, as well as an outlet pipe 14 for conveying the washing liquid away from the nozzle. Often in practice, the nozzle 7 is a first nozzle, where the outlet pipe 14 is arranged to convey the washing liquid away from the first nozzle 7 and towards a second nozzle (not shown) located near another end of the wiper rod 3. Hence, both nozzles are connected to a common reservoir for the washing liquid, so that in practice washing liquid is sprayed onto the windscreen to be wiped from these two nozzles at a small distance relative to the windscreen to be wiped, while following the oscillatory movements of the windscreen wiper arm 1.

Figure 3A:
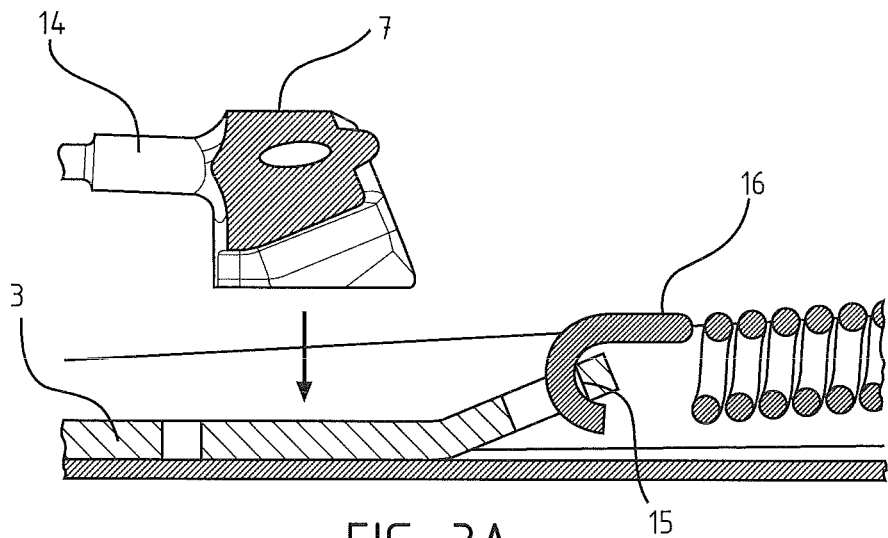
FIG. 3 shows a side view of the windscreen wiper arm of FIGS. 1 and 2, partly in cross-section and open from above illustrating how a nozzle is mounted thereon.
Figure 3B:
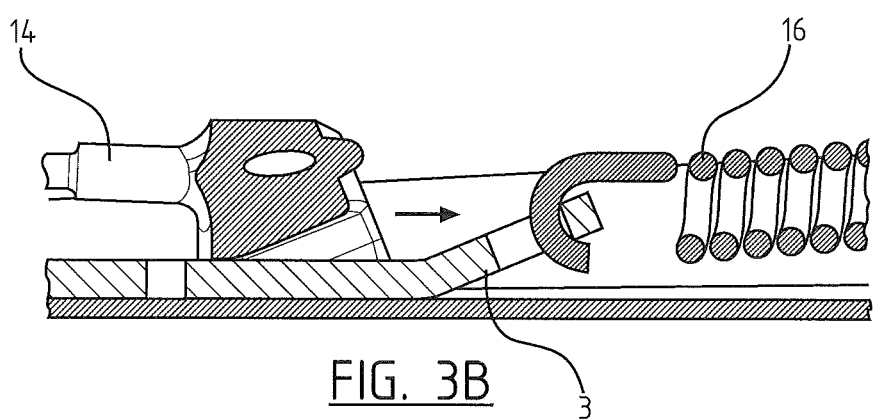
Figure 3C:
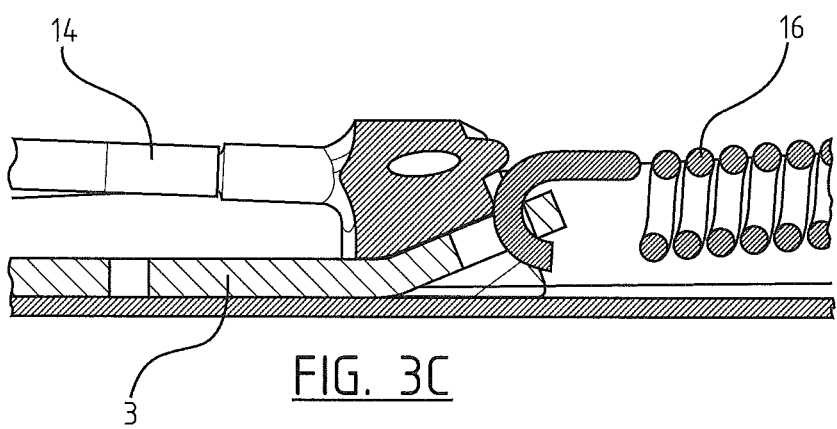
Figure 4:
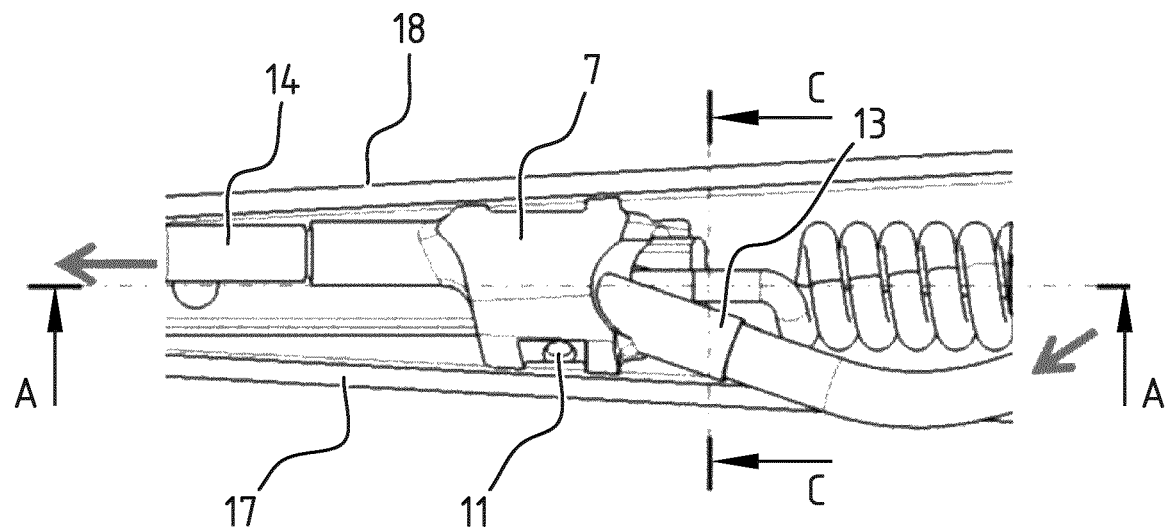
FIG. 4 is a bottom view of a part of the windscreen wiper arm of FIGS. 1 and 2 with the nozzle of FIG. 3 mounted, and two cross-sectional views along the lines A-A and C-C of the bottom view.
Figure 4:
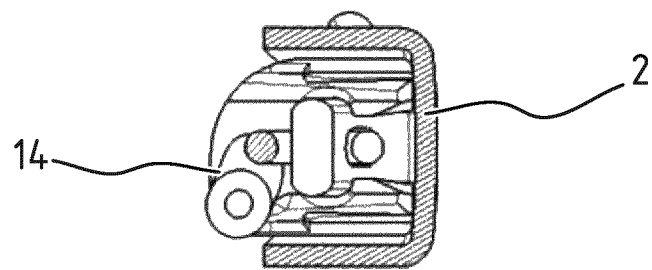
Figure 4:
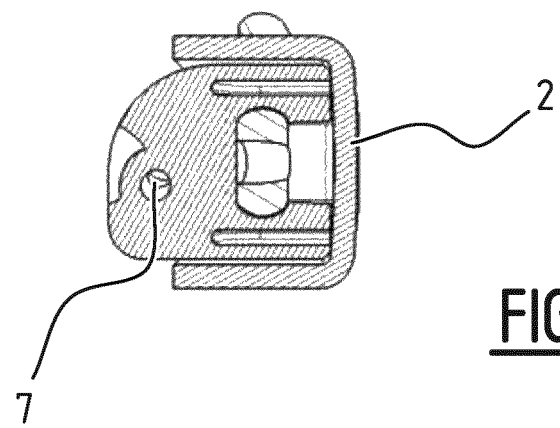
Figure 5:
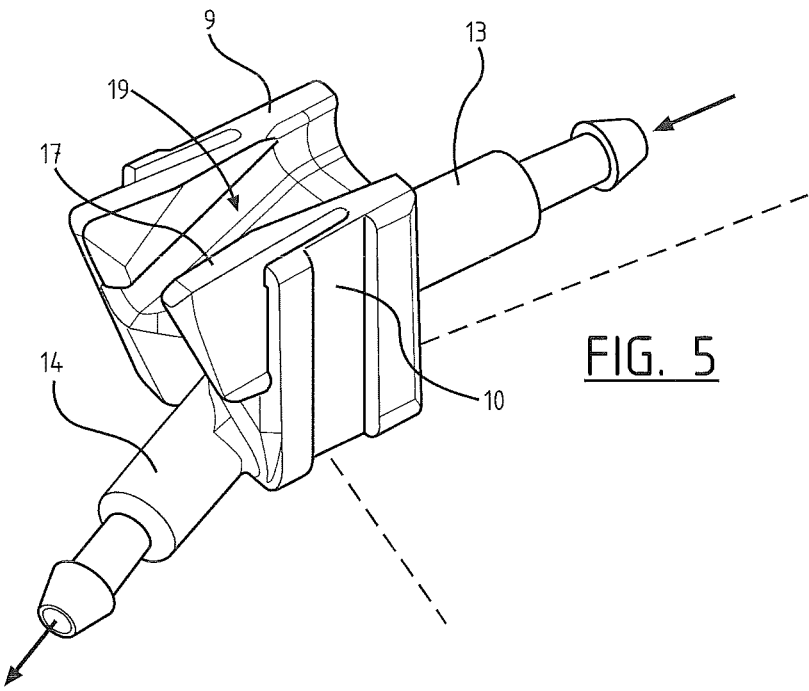
FIG. 5 is a perspective view of the nozzle according to the invention to be used in the oscillating arm of FIGS. 3 and 4.
Figure 6:
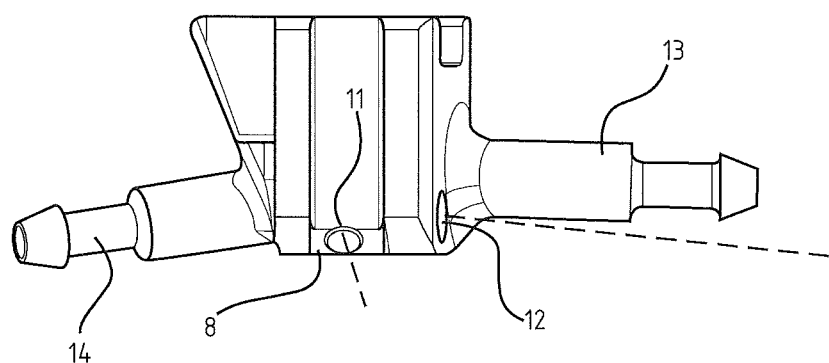
FIG. 6 is a side view of the nozzle according to the invention to be used in the oscillating arm of FIGS. 3 and 4.
Figure 7:
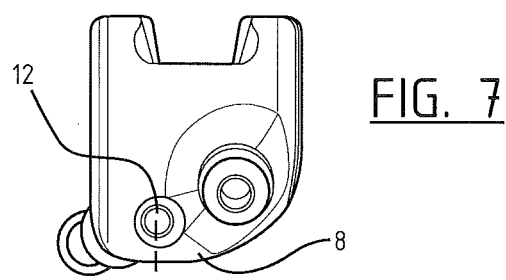
FIG. 7 is a front view of the nozzle according to the invention to be used in the oscillating arm of FIGS. 3 and 4.

As shown in FIG. 3, the wiper rod 3 near the one end thereof that extends inside the U-shaped cross-section of the wiper arm member 2 bends outwardly and comprises a hole 15 for hooking an end of a spring 16 therein. While resting inside the U-shaped cross-section of the wiper arm member 2, the spring 16 at one end is connected to the mounting head (not shown) and at another end is connected to the wiper rod 3 through the hole 15. Hence, a movement of the nozzle 7 in a longitudinal direction is blocked by the spring 16 in a direction towards the mounting head, and by tapering sidewalls 17, 18 of the U-shaped cross-section of the wiper arm member 2 in a direction away from the mounting head. With reference to FIG. 3, the nozzle 7 is mounted inside the U-shaped cross-section of the wiper arm member 2 in the direction of the arrow of FIG. 3a, i.e. in transverse direction perpendicular to the longitudinal direction of the wiper arm 1. Secondly, according to FIG. 3b, the nozzle 7 is then slid in a longitudinal direction towards the spring 16 (that is: in the direction of the arrow of FIG. 3b). The sliding movement is completed until the sidewalls 9, 10 of the nozzle 7 are snapped around the wiper rod 3 (FIG. 3c). In this respect it is noted that the base 8 and the sidewalls 9, 10 of the U-shaped cross-section of the nozzle 7 define a guiding groove 19 for slidingly guiding the nozzle 7 in the longitudinal direction onto the wiper rod 3.

Figure 8:
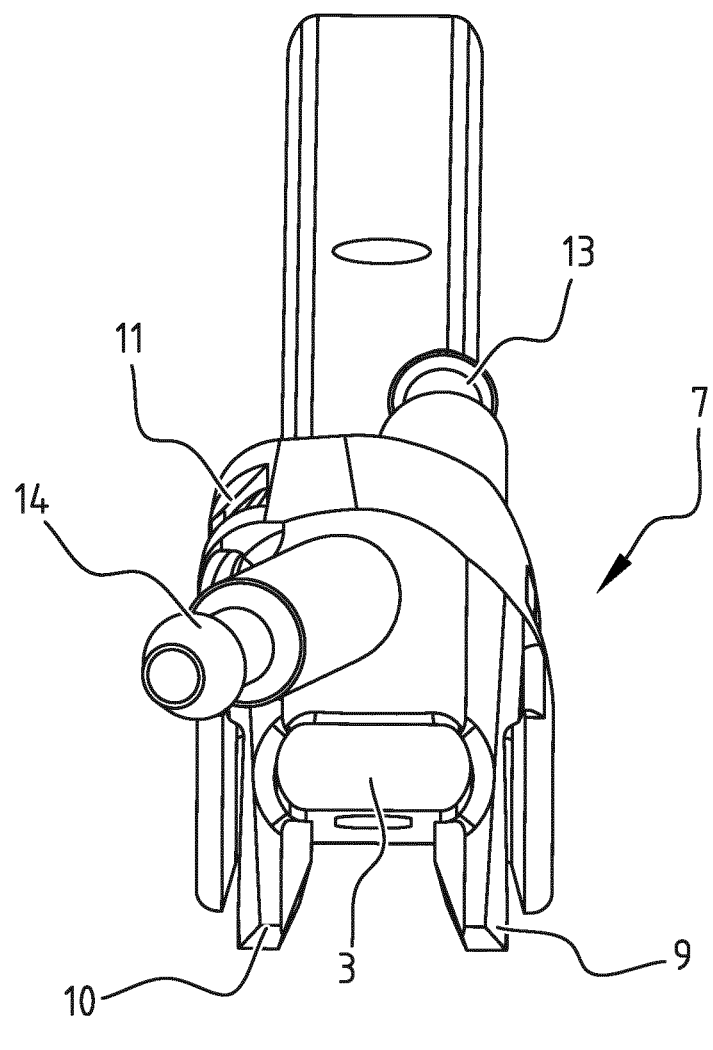
FIG. 8 is a perspective front view of the nozzle of FIGS. 5, 6 and 7.
Figure 8:
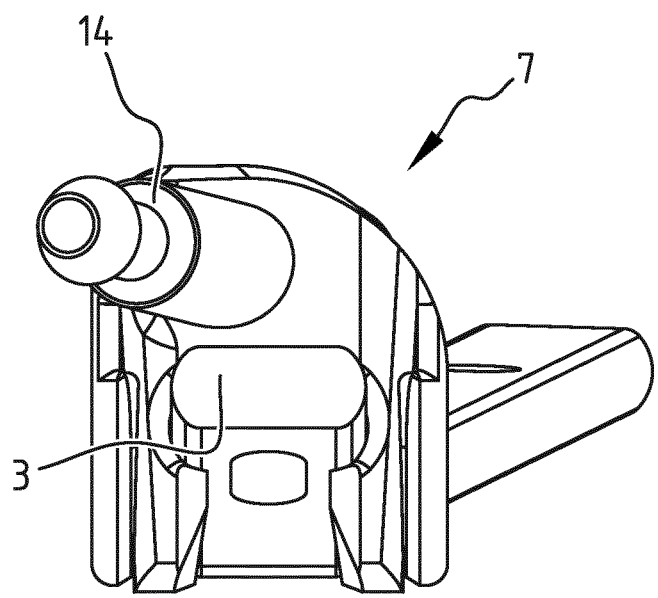

In FIG. 8 the nozzle 7 is shown in a front view, where corresponding parts have been designated with the same reference numerals.

The present invention is not restricted to the embodiment shown in the figures, but extends also to other preferred variants falling within the scope of the appended claims.

The invention claimed is:

1. A windscreen wiper arm comprising:
 a wiper arm member having a substantially U-shaped cross-section arranged to be pivotally connected to a mounting head mounted on a drive shaft;
 a wiper rod having a first end rigidly connected to and extending inside said wiper arm member and a second end arranged to be connected to an elongated wiper blade to be placed in abutment with a windscreen to be wiped;
 a nozzle for spraying a washing liquid onto the windscreen to be wiped, wherein said nozzle is detachably connected to said wiper rod inside said U-shaped cross-section of said wiper arm member, wherein a portion of said wiper rod near said first end comprises a hole; and
 a spring inside said U-shaped cross-section of said wiper arm member, wherein one end of said spring is arranged to be connected to the mounting head and another end of said spring extends through said hole in said wiper arm member, and said spring biases said nozzle towards the mounting head to mitigate longitudinal movement of the nozzle, tapering sidewalls of said U-shaped cross-section of said wiper arm member mitigate longitudinal movement of the nozzle in a direction away from the mounting head.

2. The windscreen wiper arm according to claim 1, wherein said nozzle is snapped onto said wiper rod near said first end, wherein said nozzle extends inside said U-shaped cross-section of said wiper arm member.

3. The windscreen wiper arm according to claim 2, wherein said nozzle has a substantially U-shaped cross-section having a base and two spaced-apart sidewalls, and wherein said sidewalls are snapped around said wiper rod.

4. The windscreen wiper arm according to claim 3, wherein said base and said sidewalls of said nozzle define a guiding groove for slidingly guiding said nozzle in a longitudinal direction onto said wiper rod.

5. The windscreen wiper arm according to claim 1, wherein said nozzle comprises two spraying openings for spraying the washing fluid onto the windscreen to be wiped.

6. The windscreen wiper arm according to claim 5, wherein said nozzle comprises an inlet pipe for conveying the washing liquid towards said nozzle and an outlet pipe for conveying the washing liquid away from said nozzle.

7. The windscreen wiper arm according to claim 6, wherein said outlet pipe is arranged to convey the washing liquid away from said nozzle towards a second nozzle located near said second end of said wiper rod.

8. The windscreen wiper arm according to claim 7, wherein said wiper arm member comprises a single sheet material, wherein parts of said sheet material are folded outwardly to form legs of said U-shaped cross-section of said wiper arm member, and wherein said legs of said U-shaped cross-section of said wiper arm member are locally folded around said second end of said wiper rod.

9. The windscreen wiper arm according to claim 8, wherein said second end of said wiper rod is arranged to be pivotally connected through a bayonet connection to the elongated wiper blade, wherein the elongated wiper blade is of a flat blade type.

* * * * *